United States Patent [19]
Inaba

[11] Patent Number: 5,543,274
[45] Date of Patent: *Aug. 6, 1996

[54] PHOTOGRAPHIC FILM

[76] Inventor: Minoru Inaba, No. 1116, Oaza Samukawa, Oyama-shi, Tochigi-ken, Japan

[ * ] Notice: The term of this patent shall not extend beyond the expiration date of Pat. No. 5,447,828.

[21] Appl. No.: 355,595

[22] Filed: Dec. 14, 1994

[51] Int. Cl.$^6$ .................................................. G03C 1/765
[52] U.S. Cl. .......................... 430/496; 430/501; 430/347; 430/644; 354/111; 354/114; 354/116; 352/241
[58] Field of Search ..................................... 430/496, 501, 430/347, 644; 354/111, 114, 116; 352/241

[56] References Cited

U.S. PATENT DOCUMENTS

| | | | |
|---|---|---|---|
| 4,295,713 | 10/1981 | Edwards | 352/241 |
| 5,338,650 | 8/1994 | Iwagaki | 430/501 |
| 5,447,828 | 9/1995 | Inaba | 430/496 |

FOREIGN PATENT DOCUMENTS

| | | | |
|---|---|---|---|
| 423398 | 4/1911 | France | 352/241 |
| 1134573 | 4/1957 | France | 352/241 |

*Primary Examiner*—Mark F. Huff
*Attorney, Agent, or Firm*—Fattibene and Fattibene; Paul A. Fattibene; Arthur T. Fattibene

[57] ABSTRACT

A photographic film which makes it easy to recognize the positions for cutting the photographic film into frames and which can be used for both stereoscopic cameras and general cameras. The photographic film 1 is perforated as designated at 2 along near both the upper and lower side edges thereof maintaining a pitch which is one-half the pitch P of the pair of right and left exposure surfaces of a stereoscopic camera. The perforated holes 2 are located in a gap among the frames irrespective of whether pictures are taken by using a stereoscopic camera having a film-feeding mechanism that corresponds to the perforated holes 2 of the photographic film 1 or by using a one-frame shooting camera. The photographic film 1 can be cut maintaining a correct frame size when it is cut relying upon the upper and lower holes 2 as marks.

16 Claims, 4 Drawing Sheets

PHOTOGRAPHIC FILM

BACKGROUND OF THE INVENTION

1. Field of the Invention

The present invention relates to a photographic film and, particularly, to a perforated rolled film.

2. Description of the Prior Art

In a conventional perforated photographic film such as a 35-mm photographic film, the film is perforated along near both side edges thereof maintaining a predetermined distance. The pitch of perforation is about 4.735 mm in the case of, for example, a 35-mm film in compliance with a ratchet wheel of a traditional moving picture projector that meshes with perforations to feed a movie film. In a still camera, the ratchet wheel is brought into mesh with perforated holes to detect the amount of feeding, in order to control constant the amount of feeding each frame.

In a reversal film, so far, edges of a screen photographed in front of, for example, a black background and a gap between the screens are similarly developed in black color. Therefore, when the reversal film that is developed is to be cut into frames, it is not easy to judge the boundary between the edges of the screen and the gap between the screens. Besides, since the gap is located nearly at an intermediate portion between the perforated holes that are aligned maintaining a small pitch in a direction in which the perforated rolled film is fed, there exists no mark for determining the position for cutting. That is, the cutting position is likely to be erroneously judged which may cause damage to the screen, and attention is required for handling.

Thus, there remain technical assignments in regard to making it easy to judge the positions for cutting the developed film into frames so that the film can be easily handled, as well as to offerring a photographic film that is adapted to both general one-frame shooting cameras and to stereoscopic cameras. The object of the present invention is to solve the above-mentioned assignments.

SUMMARY OF THE INVENTION

In order to accomplish the above-mentioned object, the present invention provides a photographic film which is rolled and is perforated in the lengthwise direction thereof along near both the upper and lower side edges, or opposing first and second longitudinal side edges, thereof maintaining an equal distance and symmetrically in the up-and-down direction so that the perforations are oppositely positioned opposing each other in a line perpendicular to the longitudinal edge of the film, wherein said photographic film is perforated along both sides thereof maintaining a pitch which is one-half the pitch of a pair of exposure surfaces provided in the body of a stereoscopic camera that uses said photographic film. The invention further provides a photographic film which is perforated along both sides thereof maintaining a pitch which is one-third the pitch of a pair of exposure surfaces provided in the body of a stereoscopic camera that uses said photographic film. Moreover, the invention provides a photographic film which is perforated along both sides thereof maintaining a pitch which is the same as the pitch of a pair of exposure surfaces provided in the body of a stereoscopic camera that uses said photographic film.

According to one embodiment of the invention, the rolled photographic film is perforated along near both the upper and lower side edges thereof maintaining a pitch which is one-half the pitch of the pair of exposure surfaces of the stereoscopic camera. Therefore, perforations are located in a gap between the frames of a film on which a stereoscopic picture is photographed on different exposure surfaces and on which a next stereoscopic picture is photographed on different exposure surfaces by using a stereoscopic camera or on which pictures are shot using an ordinary one-frame shooting camera. In cutting the rolled film after developed into frames, a straight line connecting the upper and lower perforated holes serves as a mark for cutting.

According to another embodiment of the invention the photographic film is perforated maintaining such a pitch as to meet a stereoscopic camera, i.e., maintaining a pitch which is one-third the pitch of the pair of exposure surfaces of stereoscopic photography, perforated holes are located in a gap between the frames either when pictures are shot using the stereoscopic camera or the one-frame shooting camera.

According to another embodiment of the invention the photographic film is perforated maintaining a pitch of one frame to meet the stereoscopic camera, i.e., maintaining a pitch equal to the pitch of the pair of exposure surfaces of stereoscopic photography, perforated holes are located in a gap between the frames either when the stereoscopic camera of this type is used or when the one-frame shooting camera having the same screen pitch is used.

DETAILED DESCRIPTION OF THE PREFERRED EMBODIMENTS

An embodiment of the present invention will now be described in detail. For the sake of explanation, here, a stereoscopic camera will be briefly described first. A variety types of stereoscopic cameras have heretofore been known. The fundamental constitution comprises two photographing mechanisms that are provided in parallel in the body of a single camera, so that two pieces of photographs can be taken simultaneously. A set of two pieces of slide films after photographed are placed on a stereoscopic slide mount which is then loaded in a stereoscopic slide viewer using which a stereoscopic image can be viewed by two eyes.

Figure 1:
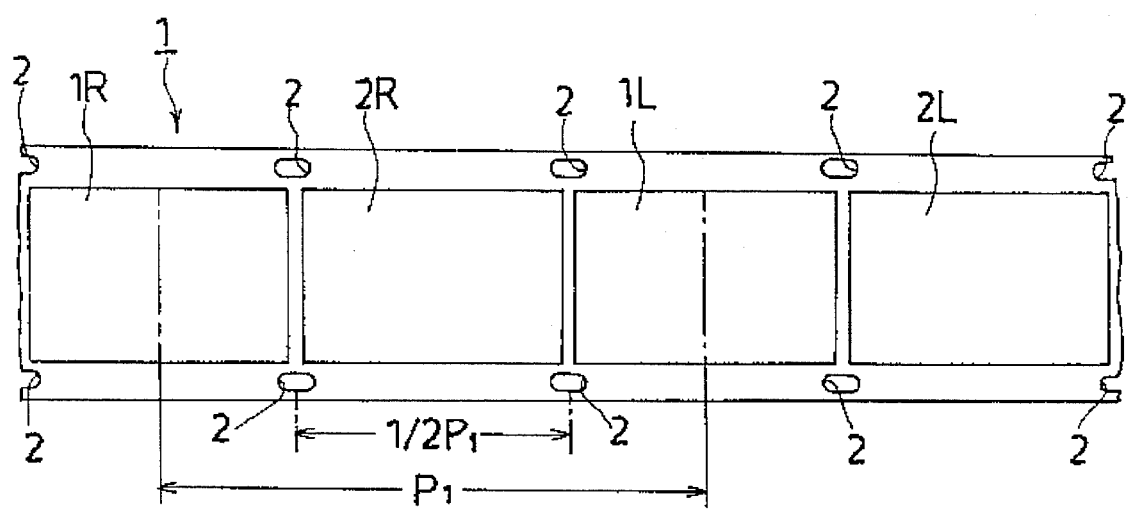
FIG. 1 is a front view of a photographic film of the invention.

FIG. 1 shows the surface of the photographic film 1 onto which a photosensitive emulsion is applied, and wherein reference numerals 1R, 2R, 1L and 2L denote exposure surfaces by the stereoscopic camera which uses the photosensitive film. When a picture is to be taken by using the stereoscopic camera, a pair of images L and R are photographed by the two photographing mechanisms.

The photographic film 1 is perforated as designated at 2 along near both side edges thereof maintaining a pitch which is one-half the pitch of the pair of exposure surfaces L and R of the stereoscopic camera. The holes 2 are perforated in a rectangular shape or in an oval shape that are elongated in the direction in which the photographic film is fed.

Accompanying the wind-up operation of the stereoscopic camera, the photographic film 1 is wound up in a manner that the exposure surface is located at a position midway between the consecutive holes 2, and the exposure surfaces 1L and 1R are shot simultaneously, followed by the shooting in the order of 2L and 2R, 3L and 3R, 4L and 4R.

The photographic film that is developed after having taken the photographs is divided into frames upon the cutting along straight lines connecting the centers of the upper and lower holes 2 that are opposed to each other, and the frames are placed on the stereoscopic slide mounts.

Figure 2:
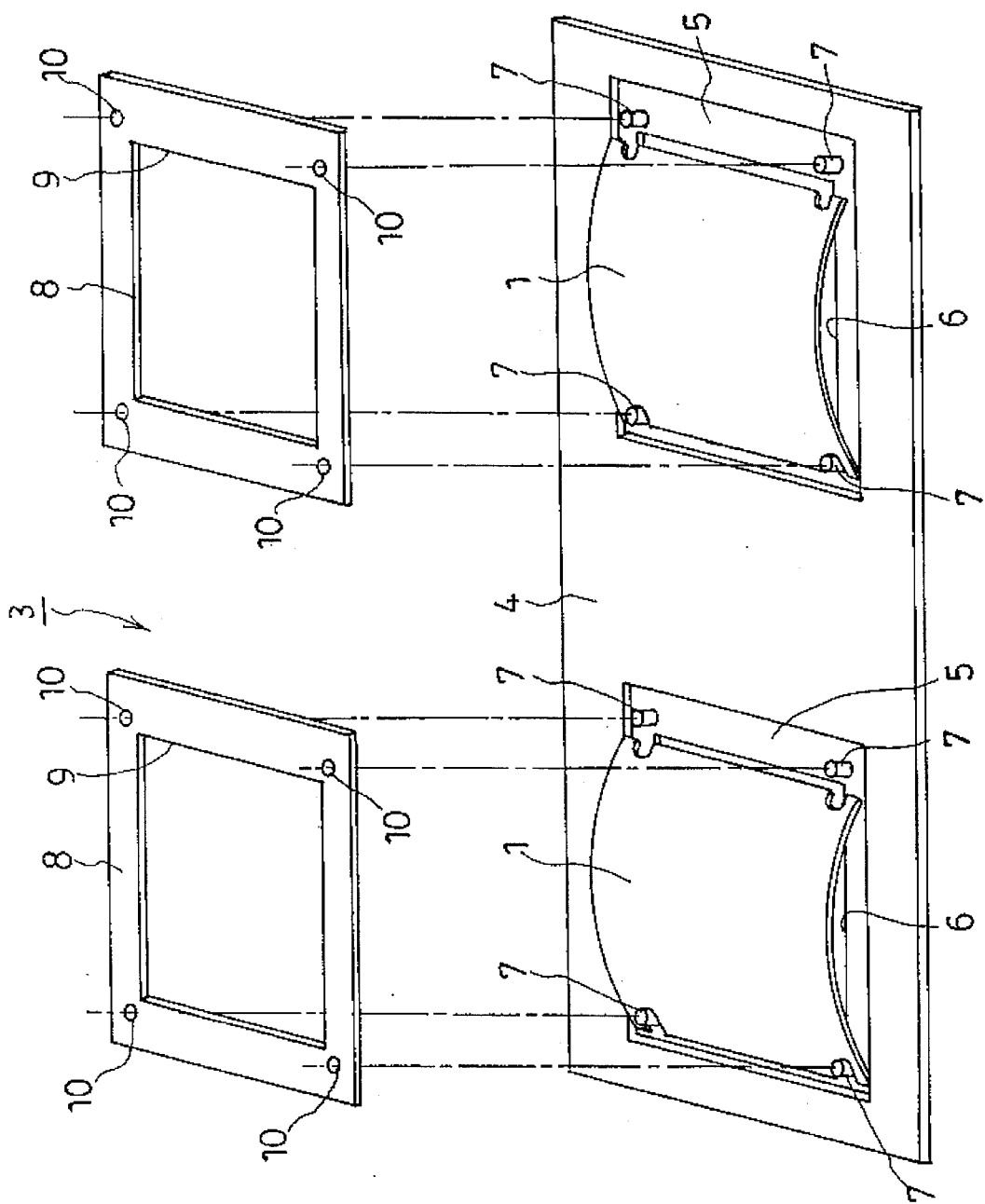
FIG. 2 is a perspective view illustrating a stereoscopic slide mount in a disassembled manner.

A stereoscopic slide mount 3 shown in FIG. 2 applies the constitution of a slide mount for one piece that has been proposed already by the present applicant (Japanese Patent Application No. 92635/1994). That is, a mount frame 4 is provided with a pair of right and left recessed film table portions 5 and a pair of right and left windows 6 maintaining a pitch equal to the distance between optical axes of a pair of photographing lenses of the stereoscopic camera, and positioning pins 7 are studded at four corners of the recessed film table portions 5. The positioning pins 7 are formed having an outer diameter that can be brought into engagement with the holes 2, the distance between the right and left positioning pins 7 is equal to the distance among the holes 2 of the photographic film 1 in the direction in which the photographic film 1 is fed, and the positioning pins 7 and the holes 2 have the same pitch in the up-and-down direction. A film holder cover 8 fitted to the recessed film table portion 5 has a window 9 formed in the central portion thereof, and has pin-insertion holes 10 formed at four corners corresponding to the positioning pins 7.

As shown in FIG. 2, a pair of stereoscopic slide films L and R that are cut into frames are placed on the recessed film table portions 5 of the mount frame 4, and film holder covers 8 are placed thereon and are fitted to the positioning pins 7. Then, the photographic film that is usually curled is corrected flat by the film holder covers 8, and the holes 2 are brought into engagement with the positioning pins 7, so that the upper, lower, right and left sides are correctly positioned.

Figure 3:
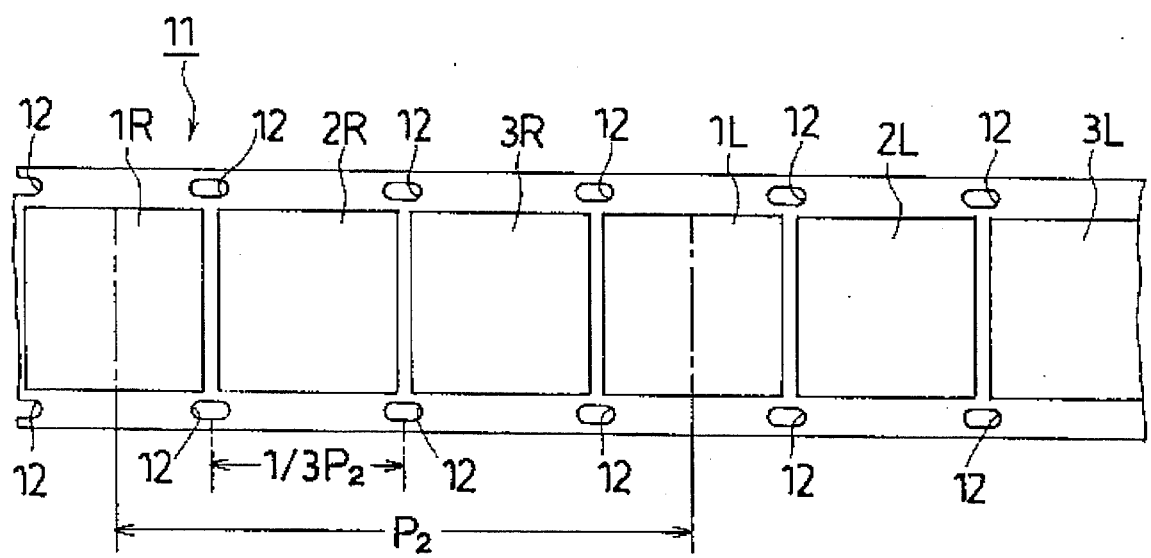
FIG. 3 is a front view of a photographic film of the invention.

Depending upon the size of the screen and the constitution of the optical system, furthermore, the stereoscopic camera may be provided with two frames of space between the pair of right and left exposure surfaces. FIG. 3 illustrates a photographic film 11 that corresponds to the above-mentioned stereoscopic camera. The photographic film 11 is perforated as designated at 12 maintaining a pitch one-third the pitch P2 of the pair of right and left exposure surfaces of the stereoscopic camera. After three sets of stereoscopic pictures 1L and 1R, 2L and 2R, and 3L and 3R are photographed, the film is wound up by four frames and, then, stereoscopic pictures 4L, 4R and subsequent stereoscopic pictures are photographed.

Figure 4:
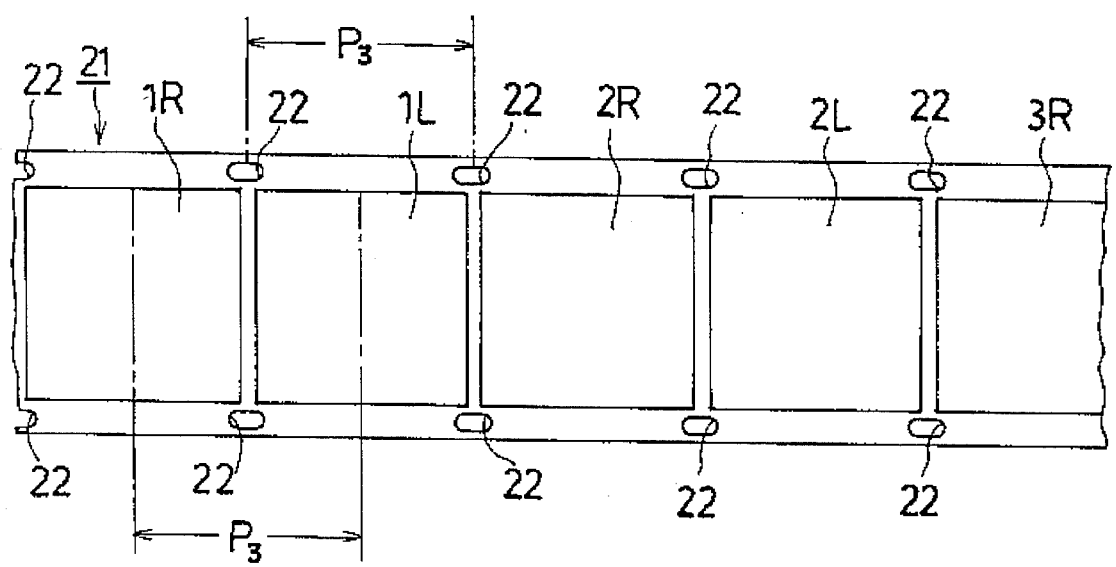
FIG. 4 is a front view of a photographic film of the invention.

In a stereoscopic camera using a film larger than the 35-mm film, the pair of right and left exposure surfaces are neighbored to each other to obtain a natural stereoscopic effect by bringing the pitch of the pair of right and left exposure surfaces close to a distance between two eyes of man. Even in a stereoscopic camera using the 35-mm film or a photographic film having a narrow width, it can be contrived to bring the exposure surfaces neighbored to each other by using a prism or the like in the optical system. FIG. 4 illustrates a photographic film 21 which is adapted to a stereoscopic camera in which the exposure surfaces are brought neighbored to each other. The photographic film 21 is perforated as designated at 22 maintaining the same pitch as the pitch P3 of the pair of right and left exposure surfaces of the stereoscopic camera. After a set of stereoscopic pictures 1L and 1R are taken, the photographic film 21 is wound up by two frames and, then, the next pictures 2L and 2R are taken.

Even when a general one-frame shooting camera is used, the above-mentioned photographic films 1, 11 and 21 are fed frame by frame to take pictures quite in the same manner as the conventional perforated photographic films.

Furthermore, the pair of right and left stereoscopic slides can be secured maintaining a proper distance without the need of adjustment when the stereoscopic slides are photographed by using the photographic films 1, 11 and 21 of the present invention using a stereoscopic camera (Japanese Patent Application No. 25229/1994) equipped with a parallax adjustment mechanism that has been proposed already by the present applicant and when the stereoscopic slides are fitted onto the aforementioned stereoscopic slide mount 3. Stereoscopic effect at the time of taking a picture can be correctly reproduced when the pair of stereoscopic slides are viewed using a stereoscopic slide viewer.

Here, it should be noted that the present invention is in no way limited to the 35-mm film only that was mentioned in the above embodiment but can be applied to a variety of perforated films as a matter of course.

According to the present invention as described above in detail, holes are located in the gaps only of the frames irrespective of whether the pictures are taken by using a stereoscopic camera or any other general camera. This helps eliminate the probability of incorrectly judging the positions for cutting into frames the reversal film bearing pictures that are taken in front of a dark background and further helps markedly improve operation efficiency. No trouble quite occurs even when the photographic films of the present invention are used in place of the existing perforated photographic films such as 35-mm films. Thus, there can be provided photographic films having a lot of advantages.

I claim:

1. A photographic film for use in a stereoscopic camera comprising:

a plurality of paired exposure surfaces, each of said plurality of paired exposure surfaces having a first pitch and capable of forming a stereoscopic image;

the photographic film having a plurality of elongated perforations oppositely positioned along both longitudinal sides thereof, the plurality of elongated perforations being elongated in a direction in which the photographic film is fed, the plurality of elongated perforations having a second pitch, and each exposure surface of said plurality of paired exposure surfaces being centered between opposing pairs of the plurality of elongated perforations, whereby the photographic film can be cut in a line between the opposing pairs of the plurality of elongated perforations forming individual frames for mounting in a stereoscopic mount.

2. A photographic film for use in a stereoscopic camera as in claim 1 wherein:

the second pitch is one-half the first pitch.

3. A photographic film for use in a stereoscopic camera as in claim 1 wherein:

the second pitch is one-third the first pitch.

4. A photographic film for use in a stereoscopic camera as in claim 1 wherein:

the second pitch is the same as the first pitch.

5. A photographic film for use in a stereoscopic camera as in claim 1 wherein:

the plurality of perforations are oval.

6. A photographic film for use in a stereoscopic camera as in claim 4 further comprising:

a plurality of gap portions formed between each of the exposure surfaces of said plurality of paired exposure surfaces, said plurality of gap portions each having a longitudinal axis laterally extending across the photographic film, and the plurality of elongated perforations having a longitudinal axis, the longitudinal axis of each one of the plurality of elongated perforations intersecting and being substantially perpendicular to the longitudinal axis of a respective one of said plurality of gap portions, such that the plurality of elongated perforations are positioned only over said plurality of gap portions, whereby laterally opposing pairs of the plurality of elongated perforations serve as a distinct target for cutting.

7. A photographic film having longitudinal sides for use in a stereoscopic camera comprising:

a plurality of paired exposure surfaces extending longitudinally along the photographic film, each of said plurality of paired exposure surfaces having a first pitch and capable of forming a stereoscopic image;

the photographic film having a plurality of oval shaped elongated perforations oppositely positioned along both longitudinal sides thereof, the plurality of oval shaped elongated perforations being elongated longitudinally in a direction in which the photographic film is fed, the plurality of oval elongated perforations having a second pitch, and each exposure surface of said plurality of paired exposure surfaces being centered between oppositely positioned pairs of the plurality of oval elongated perforations, wherein the photographic film is cut in a line perpendicular to the longitudinal sides by cutting through the centers of opposing pairs of the plurality of elongated oval perforations whereby individual frames are formed that can be accurately positioned for mounting in a stereoscopic mount.

8. A photographic film for use in a stereoscopic camera as in claim 7 wherein:

the second pitch is one-half the first pitch.

9. A photographic film for use in a stereoscopic camera as in claim 7 wherein:

the second pitch is one-third the first pitch.

10. A photographic film for use in a stereoscopic camera as in claim 7 wherein:

the second pitch is the same as the first pitch.

11. A method of forming a stereoscopic image, which comprises the step of exposing a photographic film comprising:

a plurality of paired exposure surfaces, each of said plurality of paired exposure surfaces having a first pitch and capable of forming the stereoscopic image;

the photographic film having a plurality of elongated perforations oppositely positioned along both longitudinal sides thereof, the plurality of elongated perforations being elongated in a direction in which the photographic film is fed, the plurality of elongated perforations having a second pitch, and each exposure surface of said plurality of paired exposure surfaces being centered between opposing pairs of the plurality of elongated perforations, whereby the photographic film can be cut in a line between the opposing pairs of the plurality of elongated perforations forming individual frames for mounting in a stereoscopic mount.

12. A method of forming a stereoscopic image as in claim 11 wherein:

the second pitch is one-half the first pitch.

13. A method of forming a stereoscopic image as in claim 11 wherein:

the second pitch is one-third the first pitch.

14. A method of forming a stereoscopic image as in claim 11 wherein:

the second pitch is the same as the first pitch.

15. A method of forming a stereoscopic image as in claim 11 wherein:

the plurality of perforations are oval.

16. A method of forming a stereoscopic image as in claim 11 further comprising:

a plurality of gap portions formed between each of the exposure surfaces of said plurality of paired exposure surfaces, said plurality of gap portions each having a longitudinal axis laterally extending across the photographic film, and the plurality of elongated perforations having a longitudinal axis, the longitudinal axis of each one of the plurality of elongated perforations intersecting and being substantially perpendicular to the longitudinal axis of a respective one of said plurality of gap portions, such that the plurality of elongated perforations are positioned only over said plurality of gap portions, whereby laterally opposing pairs of the plurality of elongated perforations serve as a distinct target for cutting.

\* \* \* \* \*